United States Patent Office 3,240,843
Patented Mar. 15, 1966

3,240,843
METHOD OF PRODUCING GRAFT COPOLYMERS
Alfred R. Nelson, Midland, Mich., assignor to The Dow Chemical Company, Midland, Mich., a corporation of Delaware
No Drawing. Filed Dec. 31, 1962, Ser. No. 248,194
1 Claim. (Cl. 260—879)

This invention concerns a method of preparing graft copolymers. More precisely it relates to a method of upgrading a polymer by a graft type copolymerization of monomers with a free-flowing, porous polymer.

It is common practice to upgrade polymers by grafting one or more monomeric compounds to the polymer. These graft copolymers containing branches of different monomeric units attached to the backbone or trunk polymer chain in the copolymer molecule usually bring about significant changes in physical properties such as impact strength, heat distortion, and solubility as well as the processability of the graft copolymer over the corresponding properties of the original polymer. Graft copolymers frequently are useful in many applications where the backbone or base polymer is unsatisfactory, therefore there is considerable interest in methods or processes for preparing graft copolymers from these more basic polymer compositions.

Among the methods of preparing graft copolymers are those which involve the dispersion of the backbone polymer and the monomer to be grafted thereto in a liquid reaction medium. A catalyst or reaction initiator is dissolved in either the monomer or the reaction medium to produce active spots where the monomer may attach. When the reaction has proceeded to the desired extent the graft copolymer and unreacted monomer are separated from the mixture and the copolymer is dried.

In addition to the graft copolymer and the unreacted monomer, the polymer product may contain a homopolymer of the monomer. Also, where two or more monomers are being grafted to the polymer substrate, copolymers of these monomers may be formed. These homopolymer and/or copolymer materials contaminate the graft copolymer, usually imparting undesirable properties to it.

It is, therefore, an object of my invention to provide a method of preparing graft type copolymers which substantially inhibits or entirely avoids the production of contaminating homopolymers and/or copolymers of the graft monomers. Another object is to simplify the recovery of a graft type copolymer by eliminating the use of a reaction medium in the preparation of the copolymer. A further object is to simplify the reactor loading procedure and avoid the need for a product drying step. It is also an object to provide a convenient method for upgrading porous particulated polymers.

These and other objects are accomplished according to my invention by dissolving a suitable catalyst or polymerization initiator in the monomeric material, then contacting or adding the resulting solution to a quantity of the porous particles of backbone polymer. The quantity of monomer must not exceed the maximum which can be absorbed by the porous polymer so that particle agglomeration does not occur. Thereafter, the temperature of the mixture is brought up to that which produces reaction between the monomer and polymer. The polymeric product is believed to be a true graft copolymer with monomeric branches attached to the backbone or trunk polymer chain, although a portion of the monomer may be homopolymerized while intimately dispersed or absorbed in the porous substrate polymer particles. The properties of the polymer product suggest a graft type copolymer rather than a polyblend, and for these reasons the product is referred to herein as a "graft type copolymer."

This method is particularly adapted to the production of graft type copolymers of materials such as polyvinyl chloride which are normally prepared in the form of discrete particles having substantial porosity. The impact strength and processability, i.e., the ease of calendering and extrusion, can be improved appreciably by grafting monomers such as styrene and butadiene to the polyvinyl chloride.

In utilizing this method to produce a graft type copolymer of polyvinyl chloride, the dry polymer is loaded in a reactor equipped with a stirrer and having temperature control means about the reactor shell. Air or other oxygen-containing gas which might have entered the reactor during the loading step should be removed by flushing with nitrogen or other inert gas. Thereafter the monomer containing dissolved polymerization catalyst and modifiers or chain regulators is added slowly to the reactor while the polymer is stirred. After stirring for about one to five minutes the monomer solution is completely absorbed on the porous polymer leaving a free-flowing material which can be stirred without danger of agglomeration. The reaction between the monomer and polymer is brought about by increasing the temperature of the mixture. This can be accomplished by circulating a heated fluid about the shell of the reactor. As the reaction proceeds it may be necessary to lower the temperature of the circulating fluid to remove the heat of reaction. When the reaction is complete, the unreacted monomers may be separated by evacuation while the polymer is hot.

The polymer material to be charged to the reactor must be in the form of porous, finely divided, free-flowing particles. Many commercial polymers are recovered as porous beads or pellets when the monomer is polymerized in an aqueous dispersion with a catalyst dissolved in the monomer. The particle size and porosity are dependent to a great extent on the conditions under which they were produced. The rate and extent of monomer absorption by the polymer are affected by particle size, pore diameter, and porosity. The larger the size of the particles, the longer it takes for the monomer solution of catalyst to permeate the particle. To promote more uniform contact of the monomer with the polymer it is desirable that the porosity be provided by capillary passages throughout the particle rather than a few large diameter pores. Dense, low porosity polymers generally cannot be upgraded according to the method of this invention owing to their inability to absorb the monomer and catalyst so that a non-agglomerating solid is obtained.

This method may be used to upgrade any polymer which can be obtained in the porous particle structure and which is capable of forming graft type copolymers. Among those which are available in this form are polyvinyl chloride, chlorinated polyvinyl chloride, polyethylene, polypropylene and high vinyl polymers of vinylidene containing at least 80 percent vinyl chloride.

Monomers which may be used to upgrade polymers by graft type copolymerization according to the invention are vinylidene aromatic compounds such as styrene, vinyltoluene, vinylxylene, ethylvinylbenzene, p - tert. - butylstyrene, isopropylstyrene, chlorostyrene, dichlorostyrene, conjugated diolefins, e.g. butadiene, isoprene, 2-methylbutadiene, and vinylidene compounds such as acrylonitrile or lower alkyl esters of acrylic acid, e.g. methyl methacrylate, or mixtures of any two or more of such monomers can also be used. Any one of the catalysts or initiators known to be effective with these compounds may be used. The catalyst must be one which is soluble in the monomer so that catalysis will be uniform throughout the polymer particles. The organic peroxides such as lauroyl peroxide, benzoyl peroxide, di-tert.-butyl peroxide, dicumyl peroxide and the like are suitable for these polymerizations.

The following examples illustrate the use of this method to upgrade polymers to an easy fabricating form having desirable impact properties.

*Example 1*

A clean, dry reactor was charged with 85 parts by weight of a commercial grade polyvinyl chloride powder having about 90 percent of its particles which pass a 50 mesh screen and are retained on a 200 mesh screen. A mixture of monomers consisting of 1.2 parts by weight alpha-methyl styrene, 1.8 parts butadiene and 12 parts methyl methacrylate was combined with 0.75 percent by weight (based on monomers) of lauroyl peroxide as catalyst and 0.4 percent of bromo trichloromethane as chain regulator to produce a solution of these materials. After purging the reactor with nitrogen to remove oxygen which inhibits polymerization, the monomeric solution was charged to the reactor. The mixture of polymer and monomers was stirred for about five minutes to produce a free-flowing mixture. At this time the temperature of the bath surrounding the reactor was increased to approximately 75° C. and held at that level for one hour. The reactor was then opened and unreacted gases vented therefrom. The graft type copolymer obtained in this manner is a medium impact plastic having excellent fusing and very easy processing characteristics at 171° C., as well as excellent clarity whereas the backbone polymer had poor fusing and processing properties.

*Example 2*

An easy fabricating, high impact polyvinyl chloride was prepared using the same procedure as in Example 1 with the following materials: 80 parts by weight polyvinyl chloride and a monomer solution consisting of a mixture of 5.4 parts alpha-methyl styrene, 12.6 parts butadiene, 2.0 parts acrylonitrile, 12.8 parts methyl methacrylate, 0.75 weight percent lauroyl peroxide as catalyst, and 0.4 weight percent bromotrichloromethane as chain regulator. After reaction at 75° for three hours, the unreacted monomers were vented then the graft copolymer was cooled and removed from the reactor to determine its physical properties. The material was tested on a calender mill and found to have excellent fusing properties with a fluid bank and smooth edges as it was milled at 171° C. The Izod notched impact strength was 34 foot-pounds per inch.

*Example 3*

The reactor was charged with 25 parts by weight of porous polyethylene particles then evacuated and purged with nitrogen. The catalyst, 0.025 part benzoyl peroxide, was dissolved in the monomeric solution containing 0.88 part styrene, 1.38 parts butadiene and 0.25 part acrylonitrile, then the solution was added to the reactor. The monomer-polymer mixture was blended so that a free-flowing uniform mixture was obtained. The temperature was raised to 75° C. and held at that level for three hours. Thereafter the reactor was vented and the unreacted monomers evacuated. A material balance revealed 76 percent conversion of the monomers. The appearance of the product copolymer was unchanged from that of the original polyethylene, indicating the monomer reacted inside the pores of the backbone polymer.

*Example 4*

Polypropylene was upgraded using the same procedure as described in Example 3. The reactor was charged with 50 parts polypropylene and a solution containing 1.76 parts styrene, 2.76 parts butadiene, 0.50 part acrylonitrile and 0.050 part benzoyl peroxide. After holding the reactor at 75° C. for three hours, 72 percent of the monomer was copolymerized with the backbone polymer. The graft copolymer had the same appearance as the original polypropylene.

*Example 5*

Chlorinated polyvinyl chloride was copolymerized in this manner by charging 85 parts of the polymer to the reactor followed by 4.8 parts alpha-methyl styrene, 7.2 parts butadiene, 3 parts methyl methacrylate, 0.15 part benzoyl peroxide and 0.06 part dibromodichloroethane. 70 percent of the monomers were converted in three hours at 90° C., with no change in the appearance of the polymer.

Methyl methacrylate reacts readily with polyvinyl chloride therefore it may be desirable in some instances to graft a portion of this monomer on the polymer before the other monomers are added to the reactor. Polymers upgraded in this manner have physical properties somewhat different from those where all monomers are added at the same time. Also stage addition of the monomer solution may be used if the introduction of the total charge at one time would produce agglomeration of the polymer particles.

Although my invention has been described with particular reference to the graft-type copolymerization of polyvinyl chloride it should be understood that the invention is not so limited and applies equally well to graft type copolymers of other particulated porous polymers. Therefore, my invention should be construed according to the appended claim.

I claim:

A method of upgrading polyvinyl chloride comprising:
placing a quantity of said polyvinyl chloride in a reaction chamber,
adding to said reactor a first quantity of methyl methacrylate having a polymerization catalyst dissolved therein,
stirring said polyvinyl chloride and methyl methacrylate mixture until a free-flowing material is produced, thereafter
increasing the temperature of said mixture to a level suitable for reacting said methyl methacrylate with said polyvinyl chloride, then
adding to said reactor a second quantity of methyl methacrylate together with a mixture of styrene, butadiene and acrylonitrile having a polymerization catalyst dissolved therein,
continuing to stir said mixture until a non-agglomerating free-flowing material is produced then maintaining said temperature at said reaction level, thereafter,
venting said reaction chamber and withdrawing said upgraded polyvinyl chloride.

References Cited by the Examiner

UNITED STATES PATENTS

| | | | |
|---|---|---|---|
| 3,081,242 | 3/1963 | Smith et al. | 260—884 |
| 3,102,050 | 8/1963 | Canterino et al. | 260—878 |
| 3,125,546 | 3/1964 | Pinner et al. | 260—884 |

MURRAY TILLMAN, *Examiner.*

MURRAY TILLMAN, *Examiner.*